United States Patent [19]

Ciliberti, Jr.

[11] 4,295,705
[45] Oct. 20, 1981

[54] ONE PIECE CONNECTOR

[75] Inventor: Frank L. Ciliberti, Jr., Ossining, N.Y.

[73] Assignee: Duracell International Inc., Bethel, Conn.

[21] Appl. No.: 24,122

[22] Filed: Mar. 26, 1979

Related U.S. Application Data

[62] Division of Ser. No. 787,683, Apr. 14, 1977.

[51] Int. Cl.³ .......................................... H01R 13/415
[52] U.S. Cl. ............................. 339/220 R; 339/131; 339/252 P
[58] Field of Search ............... 339/131, 220 R, 220 C, 339/220 T, 252 P; 429/121, 170, 179–182; 85/37, 70

[56] References Cited

U.S. PATENT DOCUMENTS

| | | | |
|---|---|---|---|
| 2,036,759 | 4/1936 | Kleinmann | 339/252 P |
| 2,376,072 | 5/1945 | Miller | 85/70 |
| 2,424,528 | 7/1947 | Wild | 339/220 T |
| 3,042,734 | 7/1962 | Carmichael et al. | 429/165 |
| 3,358,550 | 12/1967 | Crowther et al. | 85/37 |
| 3,541,496 | 11/1970 | Castellani | 339/220 R |
| 3,980,367 | 9/1976 | Laserson et al. | 339/220 R |

FOREIGN PATENT DOCUMENTS

| | | | |
|---|---|---|---|
| 1615719 | 3/1970 | Fed. Rep. of Germany | 339/220 R |
| 558199 | 12/1943 | United Kingdom | 339/258 A |

Primary Examiner—Neil Abrams
Attorney, Agent, or Firm—Ronald S. Cornell; Israel Nissenbaum; Martin M. Glazer

[57] ABSTRACT

A one piece connector, as for a battery, comprising a connecting means having an integral bottom wall with a boss extending from the bottom wall, the boss being formed of continuous material. A connector assembly in which the said one piece connector is attached to a supporting means.

6 Claims, 4 Drawing Figures

ONE PIECE CONNECTOR

This is a division of application Ser. No. 787,583, filed Apr. 14, 1977.

The present invention relates to one piece connectors and more particularly to one piece electrical connectors for batteries.

When man began to manufacture various items, a need appeared for a means of temporarily connecting two or more items. One solution to this problem was the discovery of mating male and female connectors, although other connecting means can be found in use. The type of connector used varies, depending on the particular application. For example, in battery applications there are certain requirements that a connector must meet. A battery is expected to function for extended periods. Accordingly, the terminal must be reliable and it must provide continuously satisfactory mechanical and electrical connections over the entire life of the battery. Similar requirements may also be found in other applications where long life and reliability are necessary.

A further requirement of battery connectors is that they seal the battery container so that no corrosive material can leak out. This requirement has, in the past, been partially satisfied by the use of a two piece connector in which a connecting means, such as a female mating device, is manufactured with a hole in the center of its base. Then a rivet is inserted through a supporting means, which is usually an insulator, and through the hole in the connecting means. The end of the rivet is clinched or peened outwardly so as to firmly attach the connecting means to the insulator. The solid head of the rivet is thereby pressed against the insulator to provide a seal and inhibit leakage. All of the internal connections of a conventional 9 volt battery are formed by welding (e.g. connections by electrically conductive tabs between the individual cells, and to the rivet heads) except for the mechanical connection between the rivet end and the connecting means which thereby forms the "weakest link" in the electrical continuity of the battery. The two piece construction and the necessary intermediate steps in the assembling of these prior art connectors renders them relatively expensive to manufacture.

Some one piece connectors have previously been used, but all contained an eyelet or an open ended boss. When such connector is attached to a supporting means, a hole remains in the connector. This is especially undesirable for some embodiments such as those destined for use in electrochemical cells since corrosive material could leak out. The connector of the present invention, with its closed end, solves this problem.

One of the requirements in the manufacture of the device of this invention is that there be no leakage path through the connecting assembly. Accordingly, the entire one piece connector is made of continuous material.

It has heretofore been believed that one piece connectors such as those contemplated by the present invention could not be formed, and that, even if capable of being formed, they could not be assembled without fracturing of the metal.

In accordance with the present invention it has now been discovered that it is possible to make a one piece connector which is readily capable of being assembled. The one piece connectors of the present invention are not only substantially cheaper to manufacture than two piece connectors, but in addition, since the connector is now a single piece, the mechanical connection at the rivet is eliminated, together with the drawbacks of such connection.

In the connector of the present invention, the portion of the connector assembly which forms the connecting means, e.g. the mating male and female elements may be the same as those heretofore used. However, instead of a separate rivet there is provided an integral boss which is formed during the manufacture of the connector.

The boss portion of the one piece connector of this invention is adapted to be inserted into an aperture in a supporting means. The boss must be longer than the thickness of the supporting means so that it will extend beyond the remote wall thereof, whereby to enable the boss to be peened against the supporting means. This action firmly attaches the connector to the supporting means and produces a connector assembly.

The dimensions of the boss will vary according to the material it is made of and the size of the connector itself. The boss must be long enough to penetrate and project beyond the supporting means. A sufficient portion of the end of the boss must project therethrough that the closed end of the boss, when peened, will form a head which is large enough to prevent the connector from being pulled out of the supporting means, as when the connector is being disconnected. The maximum length of the boss will be determined by the material used, which will affect the ability of the boss to be formed without penetration of the bottom wall by the die which forms it, which would produce an open ended boss. A practical length for a boss used in a connector for a battery would be between about 0.05 inch and about 0.1 inch in conjunction with an outer diameter of the boss between about 0.122 and 0.125 inch. The connector can be made of almost any formable or castable material. Useful materials include steel, brass, phosphorous bronze, beryllium copper. The preferred embodiment is made of steel containing some carbon and manganese and restricted amounts of sulfur and phosphorous. In one specific embodiment the connector is steel that is about 0.01 inch thick and contains between about 0.48% and about 0.55% carbon, between about 0.6% and about 0.9% manganese, a maximum of about 0.035% phosphorous and a maximum of about 0.045% sulfur. Other useful steels contain between about 0.25% and 0.4% manganese, and 0.08% maximum of carbon; between about 0.3% and 0.51% manganese and about 0.1% maximum of carbon; and between about 0.08% and 0.13% carbon, and about 0.3% and 0.6% manganese. Each of the above steels contains a maximum of about 0.035% phosphorous, and 0.045% sulfur. Each of the above materials is also sufficiently malleable to permit the formation of a closed-end boss sufficiently long to be useable. In addition, when the boss is peened during the attachment of the connector to the supporting means the material must remain continuous since, if any fractures form in the boss, material from the battery may leak through the connector.

It has been discovered that, surprisingly, the formation of the boss causes the steel to become work hardened so that resiliency of the fingers of female connecting means is increased. This mades it unnecessary to heat treat the fingers.

The supporting means must be able to hold the connector in place while it is being used and thus prevent it from being pulled out. Also the supporting means must not be damaged during the peening of the end of the boss and the attachment of the connector thereto. In addition, when the connecting means is to be used in a battery the supporting means will preferably be formed from an insulative material. Suitable such materials vary widely and include vulcanized fiber, which is made of paper that has been soaked in zinc chloride, washed and dried; and epoxy resin having a fiberglass filler. In a preferred embodiment, the supporting means has a thickness of between about 0.02 inch and about 0.04 inch.

Because the connector has only a single boss passing through the supporting means, the connector could be subject to pivotal rotation. Accordingly, the invention contemplates the use of means for preventing rotation. A presently preferred means involves the use of at least one, and preferably two, rosettes formed in the bottom wall of the connector which is to be adjacent the supporting means. The rosette is formed by forcing a cutting die through the bottom wall of the connector whereby one or more pointed edges or lances is formed, each lance extending towards the contemplated position of the supporting means. Each rosette may be small and may have as few as one lance projecting from it or, the rosette may be larger and have many more lances projecting from it. Where leakage is a potential problem it is desirable that the length of each lance be less than the thickness of the supporting means. In an alternate embodiment of the invention the die making the rosette may not penetrate the bottom wall, in which case a dimple is formed in the bottom wall. A further alternative means of preventing pivotal rotation is the use of a turned down edge of an annular flange which extends around the connecting means. This can be formed by forcing one or more parts of the edge of the annular flange into the supporting means.

The means for preventing pivotal rotation is made operable by the partial penetration of said means into the supporting means. Generally, this partial penetration occurs simultaneously with the peening of the end of the boss. The force exerted in peening the end of the boss over is sufficient to cause the lance, the dimple, or the turned edge to partially penetrate the supporting means.

The invention will be more fully understood by reference to the accompanying drawings in which.

Figure 1:
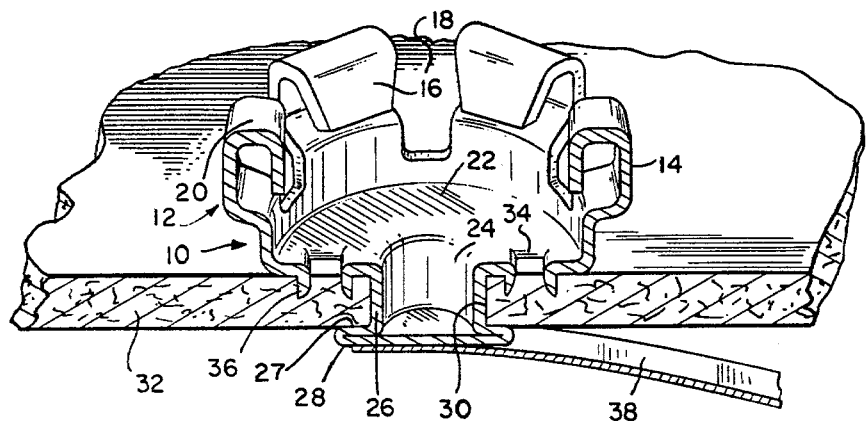
FIG. 1 is an isometric view of a female connector assembly made in accordance with the invention.
Figure 2:
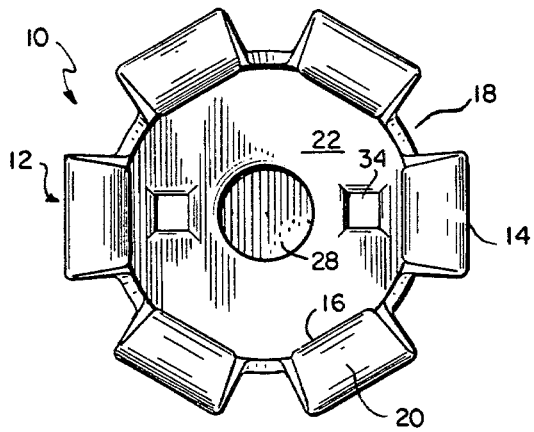
FIG. 2 is a top plan view of the one piece connector of the invention before it is attached to a supporting means.
Figure 3:
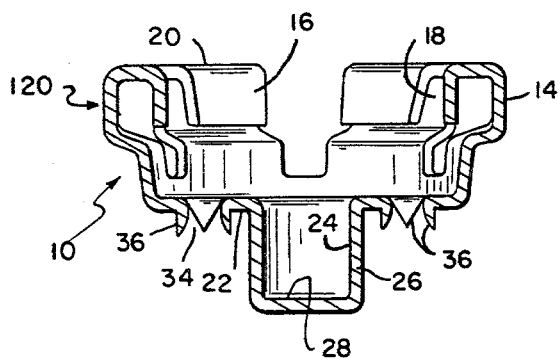
FIG. 3 is a vertical cross-sectional view taken through the diameter of the one piece connector shown in FIG. 2.

Referring now to FIGS. 1-3 of the drawings there is shown a one piece connector 10 with a connecting means 12 comprised of an outer discontinuous cylindrical wall 14, an inner discontinuous cylindrical wall 16, connecting means 20 between said walls, and a plurality of axial slits 18 passing through both said walls and said connecting means. The discontinuous cylindrical walls form a plurality of resilient fingers which are adapted to grip the corresponding parts of a male connector. The connecting means 12 is integral with planar bottom wall 22 from which integral boss 24 projects in a direction opposite to connecting means 12. The boss 24 is comprised of a substantially cylindrical neck 26, an encircling flange 27, and a closed disc shaped bottom 28. The enlarged diameter of bottom 28 together with planar wall 22 securely holds connector 10 in place on supporting means 32.

There is also provided an integral rosette 34 formed in bottom wall 22. Rosette 34 prevents pivotal rotation by virtue of four lances 36 which project from wall 22 and partially penetrates into supporting means 32. This partial penetration into supporting means 32 prevents pivotal rotation of the one piece connector 10 with respect to supporting means 32. A tab 38 from the cells of a conventional 9 volt electrochemical cell (not shown) is welded to the closed bottom 28.

FIGS. 2 and 3 show a one piece female connector 10 prior to attachment to supporting means 32 and wherein the boss is shown as having a cylindrical form without flange 27. Closed bottom 28 has a diameter less than that of aperture 30 (FIG. 1). During assembly, the closed bottom 28 of the boss 24 is flattened against the bottom of the support 32 whereby the flange 27 is formed and enlargement of bottom 28 occurs while, simultaneously, lances 36 penetrate into support 32.

Figure 4:
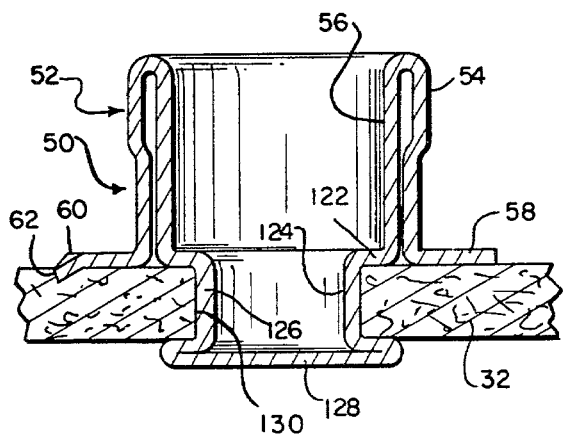
FIG. 4 is a corresponding vertical cross-sectional view of an alternate embodiment wherein a male connector is shown attached to a supporting means.

FIG. 4 shows an alternate embodiment of the invention, wherein the one piece connector assembly 50 has a male connecting means 52 which is comprised of an outer cylindrical wall 54 and an inner cylindrical wall 56. The outer wall 54 has a diameter adjacent to supporting means 32 which is less than the diameter thereof at a point nearer its opposite end so that a female connector will be securely held in place thereon. In the embodiment shown, the enlarged portion forms a cylinder of somewhat greater diameter than the cylindrical form of the small portion, but other configurations can be used.

The outer wall 54 is integral with an annular flange 58 which helps to buttress connecting means 52 against supporting means 32. In addition, flange 58 provides a means 60 for prevention of pivotal rotation. Means 60 is formed by pressing outer edge 62 of said annular flange 58 into supporting means 32 at one or more positions around the periphery of flange 58. Attachment of the male connector 50 to supporting means 32 is otherwise substantially the same as the attachment procedure described above with respect to the female connector shown in FIGS. 1 to 3. The inner wall 56 of connecting means 52 is integrally formed with a bottom wall 122 from which an integral boss 124 extends. Boss 124 is comprised of a substantially cylindrical neck 126, a flange portion 127, and a closed bottom 128 in the form of a disc. The closed bottom 128 of boss 124 has a larger diameter than the diameter of aperture 130 in the supporting means 32 whereby the boss 124 and the planar wall 122 securely hold said supporting means 32 therebetween.

It is understood that changes and variations can be made without departing from the spirit and scope of the present invention as defined in the following claims.

What is claimed is:

1. A connector assembly comprising a one piece connector attached to a support; said connector having a connecting means with an integral bottom wall; said connecting means comprising a generally cylindrical outer wall, the diameter of said outer wall adjacent said support being less than the diameter thereof at a point nearer its opposite end, said outer wall being adapted to be received within and to make good contact with the inner wall of a mating connecting means; said bottom wall having an integral boss with a closed end protruding from said bottom wall in a direction away from said connecting means; an inner wall joining the top edge of the outer wall to the bottom wall; said support having an aperture therein through which the boss extends; the bottom end of said boss being pressed flat against and in intimate contact with the surface of said support remote from said connecting means in the form of an outwardly extending shoulder having a diameter greater than the diameter of said aperture; whereby said support is secured between the shoulder of said boss and said bottom wall in sealing relationship and whereby said one piece connector is securely attached to said support.

2. The connector assembly of claim 1 and further comprising means for preventing pivotal movement of said connector.

3. A connector assembly comprising a one piece connector attached to a support; said connector having a connecting means with an integral bottom wall; said connecting means comprising a generally cylindrical outer wall, the diameter of said outer wall adjacent said support being less than the diameter thereof at a point nearer its opposite end, said outer wall being adapted to make good contact with the inner wall of a mating connecting means; a generally cylindrical inner wall reversely turned from the top edge of said outer wall and extending downwardly until it merges with said integral wall; an annular flange which extends outwardly from said outer wall, said flange being coplanar with said bottom wall; said bottom wall having an integral boss with a closed end protruding from said bottom wall in a direction away from said connecting means; said support having an aperture therein through which said boss extends; the bottom end of said boss being pressed flat against and in intimate contact with the surface of said support remote from said connecting means in the form of an outwardly extending shoulder having a diameter greater than the diameter of said aperture; whereby said support is secured between the shoulder of said boss and said bottom wall in sealing relationship and whereby said one piece connector is securely attached to said support.

4. The connector assembly of claim 2 wherein said means for retarding pivotal movement comprises an annular flange which extends outward from said outer wall, said flange being coplanar with said bottom wall, at least one outer edge of said annular flange turned towards said support, and said edge penetrates said support whereby said connecting means is held stationary in said support.

5. An electrochemical cell having a connector assembly thereon for connection of said cell to a circuit, said connector assembly including a one piece connector attached to a support; said connector having a connecting means with an integral bottom wall; said connecting means comprising a generally cylindrical outer wall, the diameter of said outer wall adjacent said support being less than the diameter thereof at a point nearer its opposite end, said outer wall being adapted to be received within and to make good contact with the inner wall of a mating connecting means; an inner wall joining the top edge of said outer wall to said bottom wall; and means integral with said connecting means for sealing said connecting means to said support, said means for sealing consisting essentially of an integral boss on said bottom wall, said boss having a closed end protruding from said bottom wall in a direction away from said connecting means; said support having an aperture therein through which said boss extends; the bottom end of said boss being pressed against the surface of said support remote from said connecting means to form an outwardly extending shoulder having a diameter greater than the diameter of said aperture, the originally cylindrical side wall of said boss being flattened into parallel relationship and intimate sealing contact with the surface of said support remote from said connecting means; whereby said support is secured between the shoulder of said boss and said bottom wall in sealing relationship and whereby said one piece connector is securely attached to said support.

6. The electrochemical cell of claim 5 and further comprising an annular flange which extends outwardly from said outer wall, said flange being coplanar with said bottom wall.

* * * * *